United States Patent Office 3,732,340
Patented May 8, 1973

3,732,340
N',O-PROPYLENE PHOSPHORIC ACID ESTER DIAMIDES
Herbert Arnold, Heidelberg, Norbert Brock, Uerentrup, and Friedrich Bourseaux and Heinz Bekel, Brackwede, Westphalia, Germany, assignors to Asta-Werke Aktiengesellschaft Chemische Fabrik, Brackwede, Westphalia, Germany
No Drawing. Continuation-in-part of applications Ser. No. 650,232, June 30, 1967, and Ser. No. 71,339, Sept. 11, 1970. This application Jan. 14, 1971, Ser. No. 106,569
Int. Cl. C07d 105/04; A01k 27/00
U.S. Cl. 260—936                                                        7 Claims

ABSTRACT OF THE DISCLOSURE

There are provided new N-substituted amides and esteramides of phosphoric acid of the Formula I:

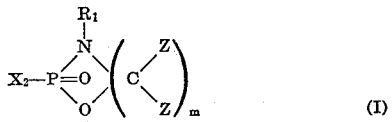
(I)

wherein $R_1$ is a lower alkyl group having from 1 to 4 carbon atoms being substituted with one or several halogen atoms, Z is hydrogen or a lower alkyl group having from 1 to 4 carbon atoms, $m$ is 2 or 3 and $X_2$ is the ethylene imino group or the group having the formula:

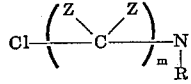

wherein R is hydrogen or a lower alkyl group having from 1 to 4 carbon atoms which may be substituted with a chlorine atom or a hydroxy group, and Z and $m$ have the above-given meaning.

Each of these products is useful as a cytostatically effective compound and is used in the manner exemplified hereinafter with respect to test animals, e.g. rats, according to known techniques for administering test dosages.

Related applications

This application is a continuation-in-part of our copending applications Ser. Nos. 650,232 filed June 30, 1967, now abandoned and 71,339 filed Sept. 11, 1970.

The present invention is related to new cyclic phosphoric acid derivatives of Formula I:

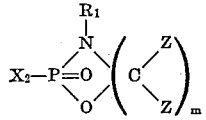
(I)

wherein $R_1$ is a lower alkyl group having from 1 to 4 carbon atoms being substituted with a chlorine atom, Z is hydrogen or a lower alkyl group having from 1 to 4 carbon atoms, $m$ is 2 or 3 and $X_2$ is the ethylene imino group or the group having the formula:

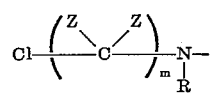

wherein R is hydrogen or a lower alkyl group having from 1 to 4 carbon atoms which may be substituted with a chlorine atom or a hydroxy group, and Z and $m$ have the above-given meaning.

As used herein, the term "lower alkyl group containing from 1 to 4 carbon atoms" means methyl, ethyl, n-propyl, isopropyl, n-butyl, isobutyl, tertiary butyl, and 1-methyl propyl. The term "halogen" means chlorine, bromine, fluorine, and iodine.

Because of their particularly valuable properties, those compounds of the above Formula I are preferred which correspond to Formula II.

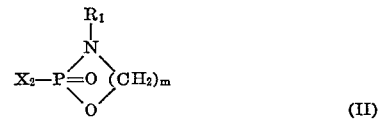
(II)

wherein $R_1$, $X_2$ and $m$ have the same meaning as in Formula I.

Most preferred are the compounds of Formula III:

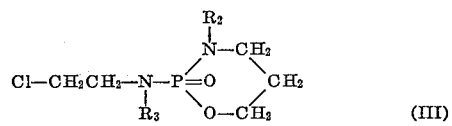
(III)

wherein $R_2$ is the β-chloroethyl or the γ-chloropropyl group, preferably the β-chloroethyl group, and $R_3$ is hydrogen, the methyl group or the ethyl group, possibly substituted in the β-position with a chlorine atom or a hydroxy group.

Among the compounds of Formula III, Compounds IV and V

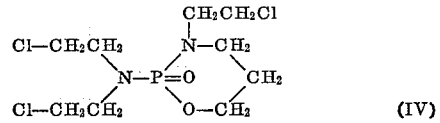
(IV)

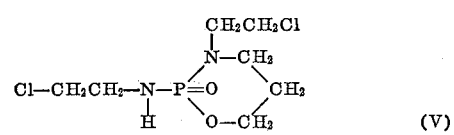
(V)

are those which up to now are known to have the best cytostatic properties wherefor these compounds are of particular value.

The new compounds of Formula I may be produced by one of the following methods designated with A, B, and C:

(A)
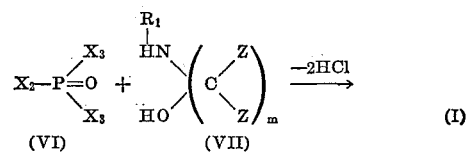
(I)

(B)
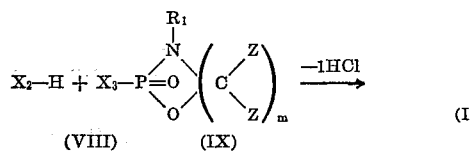
(I)

(C)
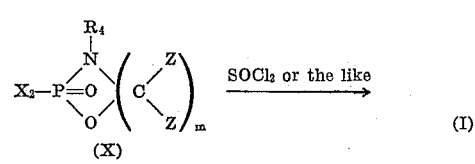
(I)

In the above Formulae VI to X, $R_1$, $X_2$, Z, and $m$ have the same meaning as in Formula I; additionally, $X_3$ is a halogen atom, preferably a chlorine atom, and $R_4$ is a lower alkyl group having from 1 to 4 carbon atoms and being substituted with a hydroxy group. The synthesis according to method A is carried out, for instance, in accordance with the German patent specifications 1,057,119 or 1,054,997 describing the reaction of phosphoric acid amide dichlorides of Formula VI in an inert solvent in the presence of two mol equivalents of triethylamine as acid binding agent. The synthesis according to method B is carried out as described for instance in J. Org. Chem. 26 (1961), page 4743. The method C applies usual methods for exchanging aliphatic hydroxy groups to halogen atoms.

Thus, the process according to the present invention for producing the new cyclic phosphoric acid derivatives of Formula I is characterized in that (A) a phosphoric acid amide dihalogenide of Formula VI

(VI)

wherein $X_3$ are halogen atoms, preferably chlorine atoms, and $X_2$ has the same meaning as in the above Formula I, is subjected to reaction with a compound of the Formula VII

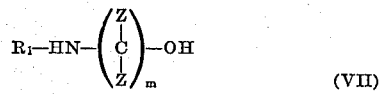
(VII)

wherein $R_1$, Z and m have the same meaning as in Formula I, or (B) a compound of Formula VIII $$X_2\text{—}H \quad (VIII)$$

wherein $X_2$ has the same meaning as in the above Formula I, is subjected to reaction with a cyclic phosphoric acid amide halogenide of Formula IX

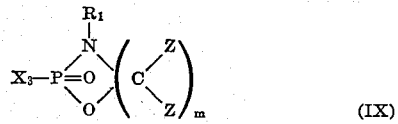
(IX)

wherein $X_3$ is a halogen atom, preferably a chlorine atom, and $R_1$, Z and $m$ have the same meaning as in the above Formula I, in the presence of an acid binding agent or (C) a compound of Formula X

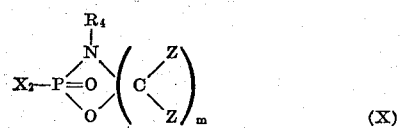
(X)

wherein $R_4$ is a lower alkyl group having from 1 to 4 carbon atoms and being substituted with a hydroxy group and $X_2$, Z and $m$ have the same meaning as in the above Formula I, is subjected to reaction with a halogenating agent.

Preferably, the reactions A, B, and C are carried out in an inert organic solvent such as a halogenated lower aliphatic hydrocarbon such as chloroform or methylene dichloride, or in an aromatic hydrocarbon such as benzene or toluene, or in an ether such as diethyl ether or dioxane. The acid binding agent should be present in an amount corresponding to at least two mol equivalents in the method embodiment A and in an amount corresponding to at least one mol equivalent in the method embodiment B in order to preferably absorb the total amount of acid $HX_3$ produced during the reactions. Many basic compounds are known to the expert useful as acid binding agent such as alkali metal carbonates and bicarbonates and particularly tertiary amines such as triethyl-amine or pyridine. The reactions A, B, and C may be carried out at room temperature or at an elevated temperature such as a temperature elevated to the boiling point of the solvent used. Halogenating agents for exchanging aliphatically bound hydroxy groups to halogen atoms are known to the expert, too. Such agents are for instance the phosphorous trihalogenides such as phosphorus trichloride $PCl_3$ and phosphorous tribromide $PBr_3$, the phosphoric acid halogenides such as phosphorous pentachloride $PCl_5$, phosphorous oxychloride $POCl_3$ and phosphorous oxybromide, the halogenides of sulphurous and sulphuric acid such as sulphuryl chloride $SO_2Cl_2$ and thionyl chloride $SOCl_2$, or phosgene and the like. Thionyl chloride is preferably used for exchanging hydroxy groups to chlorine atoms as this agent may be most simply handled. Groupments in the compounds which may be attached by the halogenating agent should possibly be protected by known protective groups which subsequently are split off again, as is known to the expert. On the other hand, it may be desired to exchange hydroxy groups in compounds of Formula X, wherein both $R_4$ as well as $X_2$ may contain hydroxy groups, to halogen atoms at the same time.

The starting component VII may be an ethylene imino alkanol of Formula XI, too:

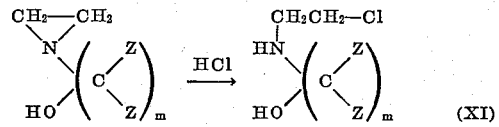
(XI)

In this case, XI is split up in situ by the hydrochloric acid produced during the reaction, thus yielding VII ($R_1=\text{—}CH_2CH_2Cl$) which subsequently undergoes reaction with VI according to the method embodiment A to yield I.

The products according to the present invention of Formula I are useful as cytostatically active compounds. Test results of pharmacological tests with products according to the present invention are given in the following Table I.

TABLE I

Curative and lethal doses of various cyclic phosphoric acid amide esters of the Formula

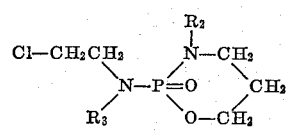

upon intraperitoneal application.

| Compound according to Example | $R_3$ | $R_2$ | LD 50 (1) Mg./kg. | LD 50 (1) Mmol./kg. | CD 50 (4) Mg./kg. | CD 50 (4) Mmol./kg. | Therapeutic Index, LD 50 (1) / CD 50 (4) |
|---|---|---|---|---|---|---|---|
| A | $-CH_2CH_2Cl$ | $-H$ | 160 | 0.57 | 12 | 0.04 | 13 |
| 1 | $-CH_2CH_2Cl$ | $-CH_2CH_2Cl$ | 75 | 0.23 | 8 | 0.025 | 19 |
| 4 | $-H$ | $-CH_2CH_2Cl$ | 160 | 0.61 | 12 | 0.046 | 13 |

Test compound A=N,N-bis-(β-chloroethyl)-amino-N',O-propylene-phosphoric acid ester diamide.
Determination of CD 50 (4) with a Yoshida-Ascites-Sarkom of rats with a total dose D subdivided into 4 subsequent days. Start up of therapy at the day of sarkom implantation; Test period: 90 days.
Determination of LD 50 (1) with a single administration to rats of the same race; Test period: 14 days.

The compound according to Example 1 is characterized by a very good chemotherapeutic effectiveness to the mouse tumours Sarkoma 37 and 'Ehrlich-Carcinoma known to be resistant to chemotherapy; the known comparative test compound A is not effective or exerts effectiveness only with subtoxic doses. The compound of Example 4 is characterized over the known test compound by that the accumulation of the toxic effectiveness is smaller in the lethality test. Thus, the LD 50 (4) of compound A is 140 mg./kg. and thus lower than the LD 50 (1) while the LD 50 (4) of the compound according to Example 4 amounts to 190 mg./kg. and thus is significantly higher than the LD 50 (1). This lower toxic accumulation is of importance in the treatment over prolonged periods of time.

Furthermore, the compound of Formula V is characterized by a high solubility in water and furthermore represents a new type of cytostatics wherein the 2-chloroethyl groups are not bound to one and the same nitrogen atom as in the nitrogen mustard compound; on the contrary, the two 2-chloroethyl groups are substituted at two different amide nitrogen atoms.

Finally, in comparison to the known cytostatic N,N-bis-β-chloroethylamino-N', O-propylene-phosphoric acid ester diamide (test compound A) which is well accepted in the medical art under the generic name Cyclophosphamide, the compounds of the present invention are characterized by an improved stability in aqueous solutions as follows from Table II. When allowing compounds of the present invention to stand in a bicarbonate buffer solution (pH 7.5) for 10 days at 37.5° C., chlorine ions are split off in an amount of only about ⅙ of the amount split off with the known test compound A.

TABLE II

| Compound of Example No.: | Val./mol chloride ions split off after 10 days |
| --- | --- |
| A | 1.26 |
| 1 | 0.12 |
| 4 | 0.18 |

The following examples serve to further illustrate the present invention without however limiting the same thereto.

EXAMPLE 1

N,N,N'-tris(2-chloroethyl)-N',O-propylene phosphoric acid ester diamide 259 g. (1 mol) of N,N-bis-(2-chloroethyl) phosphoric acid amide dichloride, 209 g. (1.2 mol) of N-(2-chloroethyl)-N-(3-hydroxypropl)-amine hydrochloride (crude), 1000 cc. of methylene dichloride and 344 g. (3.4 mol) of triethylamine.

N,N-bis-(2-chloroethyl)-phosphoric acid amide dichloride is dissolved in the methylene dichloride. N-(2-chloroethyl)-N-(3-hydroxypropyl)-amine hydrochloride is suspended in this solution and triethylamine is added thereto dropwise with stirring. The temperature of the solution rises to boiling. After the termination of the addition, the mixture is heated to boiling for another 6 hours. Thereafter, the reaction mixture is cooled down and allowed to stand overnight at about 0° C. The precipitated triethylamine hydrochloride is filtered off with suction. The resulting solution is evaporated, the residue (about 370 g.) is triturated with about 3.2 l. of ether and is heated to boiling for a short period of time. The ethereal solution is decanted from the insolubles (about 90 g.). The solution is rendered to pH 6.5 to 7 by the addition of ethereal hydrochloric acid and then is filtered over charcoal and thereafter is evaporated. During evaporation, the temperature should not rise above 40° C. The residue is dissolved in ether in an amount corresponding to half of its weight (240 g. of residue dissolved in 120 cc. of ether), the ethereal solution is cooled to —5° C. and is inoculated. After standing for 25 hours, 140 g. have been separated by crystallization. After separation by filtration with suction, the mother liquor is diluted with ether to 5 times its volume, the solution is filtered over charcoal, is again evaporated and the residue is again dissolved in a volume corresponding to half of the weight of the residue. Another cooling to —5° C. and inoculation produces further 18 g. of the desired compound. Total yield: 161 g. (50% of the theoretical). This material is also identified as 3 - (2 - chloroethyl)-2-[bis-(2-chloroethyl) amino] tetrahydro-2H-1,3,2-oxazaphorin-2-oxide; generic name: trifosfamide: F.P.: 50 to 51° C.

EXAMPLE 2

N,N,N'-tris-(2-chloroethyl)-N',O-propylene phosphoric acid ester diamide 64.7 g. (0.25 mol) of N,N-bis-(2-chloroethyl) phosphoric acid amide dichloride, 130 cc. of dioxane, 25.2 g. (0.25 mol) of ethylene imino propanol, 25.2 g. (0.25 mol) of triethylamine and 50 cc. of dioxane.

The solution of ethylene imino propanol and triethylamine in 50 cc. of dioxane is added dropwise with stirring to the solution of N,N-bis-(2-chloroethyl) phosphoric acid dichloride in 130 cc. of dioxane. The temperature has to be kept at 50° C. with cooling during the addition. After termination of the addition, the reaction mixture is stirred at 50° C. for another three hours. Thereafter, the mixture is cooled and precipitated triethylamine hydrochloride is separated by filtration with suction. The mother liquor is evaporated in a vacuum and the residue is dissolved in 500 cc. of ether. This solution is washed 3 times with water, then washed with dilute soda lye and finally washed another time with water. Thereafter, it is dried over anhydrous sodium sulphate and evaporated in a vacuum to about 130 g. This solution is cooled down to —5° C. and inoculated, thus causing crystallization and separation of 28 g. of the desired product. After separation thereof, the mother liquor is diluted with ether to about five times the initial volume. It is then filtered over charcoal and evaporated. The residue is dissolved in such a volume of ether which corresponds to half of the weight of the residue. The solution is again cooled down to —5° C. Upon inoculation, another 10 g. of the desired compound crystallizes. Total yield: 38 g. (47% of the theoretical). F.P.: 50 to 51° C.

EXAMPLE 3

N,N,N'-tris-(2-chloroethyl)-N'-O-propylene phosphoric acid ester diamide 42.6 g. (0.30 mol) of N,N-bis-(2-chloroethyl)-amine, 150 cc. of methylene dichloride, 32.7 g. (0.15 mol) of N-chloroethyl-N,O-propylene phosphoric acid ester amide monochloride and 65 cc. of methylene dichloride.

42.6 g. of N,N-bis-(2-chloroethyl)-amine are dissolved in 150 cc. of methylene dichloride. A solution of 32.7 g. of N-(2-chloroethyl)-N,O-propylene phosphoric acid ester amide monochloride in 65 cc. of methylene dichloride are added thereto with stirring. The mixture is heated to boiling for 1 hour and thereafter evaporated in a vacuum. The residue is triturated with 350 cc. of anhydrous ether and precipitated N,N-bis-(2-chloroethyl)-amine hydrochloride is separated by filtration with suction. The ethereal solution is washed with dilute hydrochloric acid and, thereafter, with a solution of sodium bicarbonate. After drying over anhydrous sodium sulfate, the ether is distilled off and the oily residue is carefully dried, dissolved in ten times its volume of anhydrous ether, filtered over activated charcoal and evaporated again. The residue is dissolved in 40 cc. of anhydrous ether. After cooling at —5° C., crystallization is initiated by inoculation. After standing for 24 hours, the precipitated crystals are filtered off with suction and dried in a vacuum. Yield: 24.3 g. (50.1% of the theoretical). F.P.: 51 to 52° C.

EXAMPLE 4

N,N'-bis-(2-chloroethyl)-N',O-propylene phosphoric acid ester diamide 127.6 g. (1.1 mol) of N-(2-chloroethyl)-amine hydrochloride are suspended in a solution of 218 g. (1 mol) of N-(2-chloroethyl)-N,O-propylene phosphoric acid ester amide monochloride in 600 cc. of methylene dichloride, and 212 g. of triethylamine are added thereto dropwise with stirring. The reaction mixture is heated to boiling by the reaction heat. After termination of the addition, the reaction mixture is heated to boiling for another 2 hours. Thereafter, it is cooled to room temperature and the precipitated triethylamine hydrochloride is separated by filtration with suction. The filtrate is extracted with about 60 cc. of dilute hydrochloric acid (pH 3), then twice with about 60 cc. of water, thereafter with about 60 cc. of dilute soda lye and finally twice with about 60 cc. of water. After drying over anhydrous sodium sulfate, methylene dichloride is distilled off under normal pressure. The oily residue is dried in a vacuum and thereafter extracted in a perforator with 500 cc. of anhydrous ether. The oily extract crystallizes upon inoculation and standing in an ice box. After standing for several hours, the precipitate is filtered off, washed with a small amount of cold ether and dried in a vacuum at room temperature. Yield: 185 g. (71% of the theoretical). This material is also identified as 3-(2-chloroethyl)-2-(2-chloroethylamino)-tetrahydro - 2H - 1,3,2-oxazaphosphorin 2-oxide; generic name: ifosfamide. F.P.: 39 to 41° C.

EXAMPLE 5

N-methyl-N,N'-bis-(2-chloroethyl)-N',O-propylene phosphoric acid ester diamide 90.8 g. of triethylamine are added to a suspension of 52.2 g. of 2-chloroethyl-3-hydroxypropyl-amine hydrochloride in 210 cc. of methylene dichloride. A solution of 52.5 g. of N-methyl-N-(2-chloroethyl)-phosphoric acid amide dichloride in 52.5 cc. of methylene dichloride is added thereto with stirring. During the addition, the reaction mixture is heated to boiling by the reaction heat. After termination of the addition, the reaction mixture is heated to boiling for another 5 hours. After cooling to room temperature, the precipitated triethylamine hydrochloride is filtered off with suction. The filtrate is washed subsequently with dilute hydrochloric acid, water, 2 N-soda lye and then twice with water. After drying over anhydrous sodium sulfate, the solution is evaporated in a vacuum and the oily residue is dissolved in twelve times its volume of ether. The resulting solution is filtered over activated charcoal and is again evaporated. The colourless oil is dried in a vacuum. Yield: 52 g. (75.5% of the theoretical).

EXAMPLE 6

N,N-ethylene-N'-(2-chloroethyl)-N,O-propylene phosphoric acid ester diamide

A solution of 0.73 g. of ethylene imine and 11.1 g. of triethylamine in 30 cc. of ether are added with stirring to a solution of 21.8 g. of N-(2-chloroethyl)-N,O-propylene phosphoric acid ester amide monochloride in 132 cc. of anhydrous ether. The temperature of the reaction mixture rises and triethylamine hydrochloride is precipitated. After termination of the addition, the reaction mixture is stirred at room temperature for another 2 hours. Thereafter, precipitated triethylamine hydrochloride is filtered off with suction, the filtrate is filtered over activated charcoal and the solvent is distilled off. The oily residue is carefully dried in a vacuum and is then dissolved in ten times its volume of anhydrous ether. The solution is filtered over activated charcoal once more and is again evaporated. The oily residue is carefully dried in a vacuum. Yield: 15 g. (67% of the theoretical).

EXAMPLE 7

N,N-bis-(2-chloroethyl)-N'-(3-chloropropyl)-N',O-propylene phosphoric acid ester diamide 31.9 g. (1/10 mol) of N,N-bis-(2-chloroethyl)-N'-(3-hydroxypropyl)-N',O-propylene phosphoric acid ester diamide are dissolved in 80 cc. of chloroform and a solution of 14 cc. (2/10 mol) of thionylchloride in 20 cc. of chloroform are added thereto with stirring. There occurs a weakly exothermic reaction. After termination of the addition, nitrogen is bubbled through the reaction mixture while heating the mixture to a temperature of 38 to 40° C. Formation of HCl and SO₂ is terminated after 3 hours. After cooling to room temperature, the solution is shaken with 0.1 N hydrochloric acid until a remaining acid reaction of the mixture. Thereafter, the mixture is neutralized by washing with dilute sodium bicarbonate solution and the neutralized chloroform solution is dried over anhydrous sodium sulfate. After separation of sodium sulfate, chloroform is distilled off in a vacuum and the oily residue is carefully dried. Yield: 16 g. (47.4% of theoretical).

EXAMPLE 8

N,N-bis-(2-chloroethyl)-N'-(3-chloropropyl)N',O-propylene phosphoric acid ester diamide 25.9 g. of N,N-bis-(2-chloroethyl)-phosphoric acid amide dichloride (0.1 mol), 18.8 g. of N-(3-chloropropyl)-N-(3-hydroxypropyl)-amine hydrochloride (0.1 mol), 30.3 g. triethylamine (0.3 mol), and 100 cc. of dioxane.

The above starting materials are heated at 50° C. with stirring for 3 hours. After cooling to room temperature, the precipitated triethylamine hydrochloride is filtered off with suction and the solution is evaporated in a vacuum. The oily residue is dissolved in 250 cc. of ether and the solution is shaken with 0.1 N hydrochloric acid until the solution remains acid. Thereafter, the solution is neutralized by washing with a dilute sodium bicarbonate solution and the neutralized mixture is dried over anhydrous sodium sulfate. After separation of the sodium sulfate, the ether is cautiously distilled off and the oily residue is carefully dried. Yield: 25 g. (74% of the theoretical).

EXAMPLE 9

N,N-bis-(2-chloroethyl)-N-(2-hydroxyethyl)-N',O-propylene phosphoric acid ester diamide A solution of 10.9 g. of N-(2-chloroethyl)-N,O-propylene phosphoric acid ester amide monochloride in 50 cc. of chloroform is added dropwise to a solution of 8.0 g. of N-(2-chloroethyl)-N-(2-hydroxyethyl)-amine hydrochloride (1/20 mol) and 10.1 g. of triethylamine (1/10 mol) in 50 cc. of chloroform at 28° C. within a period of 45 minutes. Stirring is continued for another 2 hours at room temperature and thereafter for another two hours at 40° C. After standing overnight, the precipitated triethylamine hydrochloride is filtered off with suction and the solution is evaporated in a vacuum. The oily residue is extracted in a soxhlet for several hours with anhydrous ether and the ethereal extract is evaporated in a vacuum. The resulting oily product is once more extracted with anhydrous ether in an apparatus for extracting liquids and the resulting solution is again evaporated in a vacuum. The resulting oily product is mixed with a small amount of aluminum oxide and is distilled over a porcelain frit G4. A weakly yellow oil of medium viscosity and soluble in water is obtained which oil is dried in a high vacuum for several hours. Yield: 6.5 g. (42.5% of theoretical).

EXAMPLE 10

N,N,N'-tris-(2-chloroethyl)-N',O-butylene phosphoric acid ester diamide

A solution of 25.8 g. of triethylamine in 25 cc. of methylene chloride is added dropwise with stirring to a solution of 21.4 g. of N,N-bis-(2-chloroethyl) phosphoric acid amide dichloride and 17 g. of N-(2-chloroethyl)-N-[4-hydroxy butyl-(2)] amine hydrochloride in 75 cc. of methylene chloride. The mixture then is heated to boiling for two hours and cooled to room temperature thereafter. The separated triethylamine hydrochloride is filtered off with suction and the remaining solution is evaporated in a vacuum. The residue is dissolved in twenty times the amount of ether. This solution is rendered neutral by the addition of ethereal hydrochloric acid, filtered over activated charcoal and evaporated in a vacuum. Yield in N,N,N'-tris-(2-chloroethyl)-N',O-butylene-1,3-phosphoric acid ester diamide or 2-[N-(2-chloroethyl)-amino]-3-(2-chloroethyl)-4 - methyl-tetrahydro-2H-1,3,2-oxaza-phosphorine-2-oxide: 22.2g. (80% of the theoretical). $n_D^{21}$: 1.5128.

EXAMPLE 11

N,N'-bis-(2-chloroethyl)-N',O-butylene-1,3 phosphoric acid ester diamide

A solution of 29.4 g. of triethylamine and 25 cc. of methylene chloride is added dropwise with stirring to a solution of 32 g. of N-(2-chloroethyl)-N,O-butylene-1,3 phosphoric acid ester amide monochloride (i.e. 2-chloro-3-(2'-chloroethyl) - 4 - methyltetrahydro-2H-1,3,2-oxazaphosphorine-2-oxide) and 17.7 g. of N-(2-chloroethyl) amine hydrochloride and 25 cc. of methylene chloride. The mixture is heated to boiling for two hours and cooled to room temperature thereafter. The precipitated triethylamine hydrochloride is filtered off with suction. The remaining solution is shaken consecutively with 15 cc. of dilute hydrochloric acid, 10 cc. of water, 10 cc. of an aqueous sodium bicarbonate solution and finally twice with 10 cc. of water.

The methylene chloride solution is dried over anhydrous sodium sulfate and evaporated in a vacuum. The oily residue is dissolved in four times the amount of anhydrous ether and the solution is filtered over activated charcoal and evaporated in a vacuum. Yield in N,N'-bis-(2-chloroethyl)-N',O-butylene-1,3 phosphoric acid ester diamide or 2-[N - (2 - chloroethyl)-amino]-3-(2-chloroethyl)-4-methyl-tetrahydro-2H-1,3,2 - oxaza-phosphorine-2-oxide: 32.3 g. (85% of the theoretical). $n_D^{21}$: 1.5067.

EXAMPLE 12

N,N'-bis-(2-chloroethyl)-N',O-butylene-3,1 phosphoric acid ester diamide

A solution of 42.1 g. of triethylamine and 50 cc. of methylene chloride is added dropwise with stirring to a solution of 46 g. of N-(2-chloroethyl)-N,O-butylene-3,1 phosphoric acid ester amide monochloride (i.e. 2-chloro-3-(2'-chloroethyl)-6-methyl - 2H - 1,3,2 - oxazaphosphorine-2-oxide) in 100 cc. of methylene chloride containing 25.3 g. of N-(2-chloroethyl) amine hydrochloride suspended therein. The mixture is heated to boiling for two hours. After cooling to room temperature the precipitated triethylamine hydrochloride is filtered off with suction. The remaining solution is evaporated in a vacuum at about 30° C. The oily residue is dissolved in 500 cc. of anhydrous ether. The ethereal solution is filtered over activated charcoal and again evaporated in a vacuum. Yield in N,N'-bis-(2-chloroethyl)-N',O-butylene-3,1 phosphoric acid ester diamide or 2-(2-chloroethyl amino)-3-(2 - chloroethyl)-6-methyl-2H-tetrahydro-1,3,2-oxaza-phosphorine-2-oxide: 49.8 g. (91.4% of the theoretical). $n_D^{21}$: 1.5002.

EXAMPLE 13

N,N,N'-tris-(2-chloroethyl)-N',O-butylene-3,1 phosphoric acid ester diamide

A solution of 27.3 g. of triethylamine in 25 cc. of methylene chloride is added dropwise with stirring to a solution of 25.5 g. of N,N'-bis-(2-chloroethyl)-phosphoric acid amide dichloride in 75 cc. of methylene chloride containing 18 g. of N-(2-chloroethyl)-N-(3-hydroxy-butyl) amine hydrochloride suspended therein. The mixture thereafter is heated to boiling for three hours. After cooling to room temperature, the precipitated triethylamine hydrochloride is filtered off with suction. The remaining solution is evaporated in a vacuum at about 30° C. The oily residue is dissolved in 300 cc. of anhydrous ether and the ethereal solution is filtered over activated charcoal and again evaporated in a vacuum.

Yield in N,N,N'-tris-(2-chloroethyl)-N',O-butylene-3,1 phosphoric acid ester diamide or 2-[N,N-bis-(2-chloroethyl)-amino] - 3 - (2 - chloroethyl)-6-methyl-2H-tetrahydro-1,3,2-oxaza-phosphorine-2-oxide: 23.0 g. (78.3% of the theoretical). $n_D^{21}$: 1.5059.

EXAMPLE 14

N,N'-bis(2-chloroethyl-N',O-2,2-dimethyl-propylene-1,3 phosphoric acid ester diamide 20.2 g. of 2,2-dimethyl-N-(2-chloroethyl)-amino-propanol-(1,3)-hydrochloride (1/10 mol) are suspended in 160 cc. of anhydrous chloroform. 31 g. of triethylamine (3/10 mol) are added thereto stepwise with shaking and cooling with ice. The resulting clear solution is added to a solution of 19.6 g. of N-(2-chloroethyl) phosphoric acid amide dichloride (1/10 mol) in 120 cc. of anhydrous chloroform over a period of one hour dropwise with stirring at a temperature of the reaction mixture of 20 to 25° C. Stirring is continued for two hours at 40° C. Thereafter, the solvent is evaporated in a water jet vacuum and the semi-solid residue is mixed with 100 cc. of ether. The oily component of the residue thus is dissolved and the remaining crystalline part consists of triethylamine hydrochloride. The crystals are filtered off with suction and the remaining solution is evaporated. The remaining oil is purified by extraction with 3:1 ether: petrol ether in a perforator. The clear colorless oil is soluble in alcohol, chloroform, dioxane and acetone. Yield in N,N'-bis-(2-chloroethyl)-N',O-2,2-dimethyl-propylene-1,3 phosphoric acid ester diamide or 2-(2-chloroethyl amino)-3-(2 - chloroethyl)-5-dimethyl-2H-tetrahydro-1,3,2-oxaza-phosphorine-2-oxide: 12.9 g. (44.6% of the theoretical). $n_D^{22}$: 1.5012.

The oil may be solidified by dissolving in chloroform, washing the solution consecutively with 1/10 N hydrochloric acid, 5% aqueous sodium bicarbonate solution and water, drying the solution over anhydrous calcium chloride and evaporation of the solvent. The residue is dissolved in a small amount of chloroform and the solution is passed through a column of 110 g. of silica gel. The compound then is eluated by means of 500 cc. of chloroform. The solvent is evaporated and the remaining oil is dissolved in a small amount of ether and the solution is cooled in an ice box. Crystallization is initiated by friction with a glass rod. F: 71–72° C.

EXAMPLE 15

N,N,N'-tris-(2-chloroethyl)-N',O-2,2-dimethyl-propylene-1,3-phosphoric acid ester diamide 31 g. of triethylamine (3/10 mol) are added in small amounts with stirring and cooling to a suspension of 20.2 g. of N-(2-chloroethyl)-2,2-dimethyl - amino - propanol-(1,3)-hydrochloride (1/10 mol) in 150 cc. of anhydrous chloroform. The resulting clear solution is added to a solution of 25.9 g. of N,N-bis-(2-chloroethyl) phosphoric acid amide dichloride (1/10 mol) in 150 cc. of anhydrous chloroform over a period of 15 minutes dropwise at 25° C. Stirring at 40° C. is continued for two hours. In order to completely separate the resulting triethylamine hydrochloride, 150 cc. of ether are added to the mixture which then is allowed to stand in an icebox for 20 hours. The precipitated hydrochloride is separated by filtration and the resulting solution is evaporated in a water jet vacuum. The oily residue is extracted in a perforator with 1:2 ether-petrol ether. After evaporation of the eluant, the oily residue is dissolved in methylene chloride. The solution is washed consecutively with 1/20 N hydrochloric acid, 5% aqueous sodium bicarbonate solution and water. The remaining solution is dried over anhydrous sodium sulfate. After removing of the solvent in a water jet vacuum, the oil is dried in a high vacuum. The resulting clear colorless oil is soluble in alcohol, chloroform, acetone and dioxane. Yield in N,N,N'-tris-(2-chloroethyl)-N',O-2,2-dimethyl-propylene-1,3 phosphoric acid ester diamide or 2-[N,N-bis-(2-chloroethyl)-amino] - 3 - (2-chloroethyl)-5-dimethyl-2H-tetrahydro - 1,3,2 - oxaza - phosphorine-2-oxide: 23.0 g. (66.4% of the theoretical). $n_D^{20}$: 1.5067.

EXAMPLE 16

N,N'-bis-(2-chloroethyl)-N',O-pentylene-3,1 phosphoric acid ester diamide

The ethyl compound may be prepared in the same manner as shown in Example 12 above utilizing in place of the methyl derivative starting material, namely N-(2-chloroethyl) - N,O - butylene-3,1 phosphoric acid ester amide monochloride, the corresponding ethyl derivative starting material, namely N-(2-chloroethyl)-N,O-pentylene-3,1 phosphoric acid ester amide monochloride (i.e. 2-chloro-3-(2'-chloroethyl) - 6 - ethyl-2H-1,3,2-oxaza-phosphorine-2-oxide) on an equimolar basis. The obtained final product is N,N-bis-(2-chloroethyl)-N',O-pentylene-3,1 phosphoric acid ester diamide or 2-(2-chloroethyl amino)-3-(2-chloroethyl)-6-ethyl - 2H - tetrahydro-1,3,2-oxaza-phosphorine-2-oxide.

EXAMPLE 17

N,N,N'-tris-(2-chloroethyl)-N',O-pentylene-3,1-phosphoric acid ester diamide The ethyl compound may be prepared in the same manner as shown in Example 13 above utilizing in place of the methyl derivative starting material, namely N-(2-chloroethyl)-N-(3-hydroxy-butyl) amine hydrochloride, the corresponding ethyl derivative starting material, namely N-(2-chloroethyl)-N-(3-hydroxy-pentyl) amine hydrochloride on an equimolar basis. The obtained final product is N,N,N'-tris-(2-chloroethyl) - N',O - pentylene-3,1 phosphoric acid ester diamide or 2-[N,N-bis-(2-chloroethyl)-amino] - 3 -(2-chloroethyl)-6-ethyl-2H-tetrahydro-1,3,2-oxaza-phosphorine-2-oxide. Colorless oil: $n_D^{21}$: 1.5108.

In like manner to the preceding examples, the other lower alkyl derivatives and halogen derivatives may be readily prepared by those skilled in the art.

EXAMPLE 18

Solutions in solubilizer useful for the production of injection solutions (a)

N,N,N'-tris-(2-chloroethyl) - N',O - propylene phosphoric acid ester diamide _____ mg__ 200
Solubilizer 1 - methyl-3-(2-hydroxyethyl)-imidazolidone-(2), ad. _____ cc__ 2

For producing injection solutions, the above solution is diluted with 8 to 10 cc. of water;

(b)

N,N'-bis-(2-chloroethyl)-N',O-propylene phosphoric acid ester diamide _____ mg__ 500
Solubilizer 1-methyl-3-(2-hydroxyethyl) - imidazolidone-(2), ad. _____ cc__ 2.5

For producing injection solutions, the above solution is diluted with about 15 to 20 cc. of water.

EXAMPLE 19

Dragées (a)

| | Mg. |
|---|---|
| N,N,N'-tris-(2-chloroethyl) - N',O - propylene phosphoric acid ester diamide | 50 |
| Calcium phosphoric (DAB 6 anhydr.) | 110 |
| Amylum maidis | 65 |
| Aerosol comp. | 3 |
| Magnesium stearinicum | 2 |

The above components are intimately mixed and pressed to biconvex dragée cores having a diameter of 8 mm. and a radius of crown of 6 mm. The thus obtained dragée cores are covered with a sugar coating in manners known per se to yield dragées of a total weight of 400 mg.

It is preferable to protect the dragée core with an insulating coating consisting of a polyacrylic acid product and talcum.

(b)

| | Mg. |
|---|---|
| N,N'-bis-(2-chloroethyl)-N',O-propylene phosphoric acid ester diamide | 50.0 |
| Calcium phosphoric (DAB 6 anhydr.) | 61.5 |
| Amylum maidis | 50.0 |
| Aerosol comp. | 50.0 |
| Polyvinylpyrrolidonum | 7.0 |
| Magnesium stearinicum | 1.5 |

The thus obtained biconvex dragée cores having a diameter of 8 mm. and a radius of crown of 6 mm. are coated with a sugar coating in manners known per se to yield dragées having a total weight of 390 mg. It is again preferable to protect the core by an insulating coating consisting of a polyacrylic acid product and talcum.

The sugar coatings may be colored by the addition of dyestuffs.

What is claimed is:

1. A cyclic phosphoric acid derivative of the Formula I:

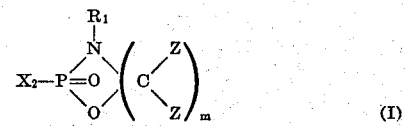

(I)

wherein $R_1$ is a member selected from the group consisting of the lower alkyl groups having from 1 to 4 carbon atoms and being substituted with a chlorine atom, Z is a member selected from the group consisting of hydrogen and the lower alkyl groups having from 1 to 4 carbon atoms, m is a numeral selected from the group consisting of 2 and 3 and $X_2$ is a member selected from the group consisting of the ethylene imino group and the group of the Formula II:

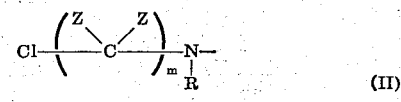

(II)

in which formula R is a member selected from the group consisting of hydrogen, the lower alkyl groups having from 1 to 4 carbon atoms and being substituted with a chlorine atom and the lower alkyl groups having from 1 to 4 carbon atoms and being substituted with a hydroxy group, and Z and m have the same meaning as given hereinabove.

2. A cyclic phosphoric acid derivative according to claim 1 wherein $X_2$ is the group

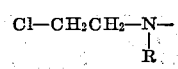

$R_1$ is a member selected from the group consisting of the β-chloroethyl and the γ-chloropropyl group, m is 3, and R is a member selected from the group consisting of hydrogen, the methyl group, the ethyl group, the β-chloroethyl group and the β-hydroxy ethyl group.

3. A phosphoric acid derivative according to claim 2, wherein $R_1$ is the β-chloroethyl group.

4. The cyclic phosphoric acid derivative as claimed in claim 3, wherein R is the β-chloroethyl group.

5. The cyclic phosphoric acid derivative as claimed in claim 3, wherein R is hydrogen.

6. The cyclic phosphoric acid derivative as claimed in claim 1 wherein Z is hydrogen.

7. The cyclic phosphoric acid derivative as claimed in claim 1 wherein Z is a lower alkyl group containing from 1 to 4 carbon atoms.

References Cited

UNITED STATES PATENTS 3,018,302  1/1962  Arnold et al. _____ 260—936

LEWIS GOTTS, Primary Examiner

A. H. SUTTO, Assistant Examiner

U.S. Cl. X.R.

260—239 EP; 424—200, 209

UNITED STATES PATENT OFFICE
CERTIFICATE OF CORRECTION

Patent No. 3,732,340  Dated May 8, 1973

Inventor(s) Herbert Arnold et al

It is certified that error appears in the above-identified patent and that said Letters Patent are hereby corrected as shown below:

Column 4, Line 17, "attached" should read -- attacked --.

Table I, last column (Therapeutic Index), second figure in column should read -- 9 -- (not 19).

Column 7, under Example 6, the subheading should read -- N,N-ethylene-N'-(2-chloroethyl)-N',O-propylene phosphoric acid ester diamide --.

Column 8, under Example 9, the subheading should read -- N,N'-bis-(2-chloroethyl)-N-(2-hydroxyethyl)-N',O-propylene phosphoric acid ester diamide --.

Column 10, Line 54, "150 cc" should read -- 130 cc --.

Signed and sealed this 23rd day of October 1973.

(SEAL)
Attest:

EDWARD M. FLETCHER, JR.
Attesting Officer

RENE D. TEGTMEYER
Acting Commissioner of Patents

UNITED STATES PATENT AND TRADEMARK OFFICE

CERTIFICATE EXTENDING PATENT TERM
UNDER 35 U.S.C. 156

Patent No.    : 3,732,340

Dated         : May 8, 1973

Inventor(s)   : HERBERT ARNOLD ET AL

Patent Owner  : ASTA PHARMA AG

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 USC 156 (b).

I have caused the seal of the Patent and Trademark Office to be affixed this 11th day of December 1989.

Jeffrey M. Samuels
Acting Commissioner of
   Patents and Trademarks